United States Patent [19]

Hines

[11] Patent Number: 4,631,914
[45] Date of Patent: Dec. 30, 1986

[54] GAS TURBINE ENGINE OF IMPROVED THERMAL EFFICIENCY

[75] Inventor: William R. Hines, Montgomery, Ohio

[73] Assignee: General Electric Company, Cincinnati, Ohio

[21] Appl. No.: 704,699

[22] Filed: Feb. 25, 1985

[51] Int. Cl.⁴ .............................................. F02C 7/00
[52] U.S. Cl. .................................... 60/39.05; 60/39.3; 60/39.55; 60/262
[58] Field of Search ................. 60/39.05, 39.53, 39.54, 60/39.55, 39.58, 39.59, 39.3, 262

[56] References Cited

U.S. PATENT DOCUMENTS

| | | | |
|---|---|---|---|
| 3,348,379 | 10/1967 | Wilde et al. | 60/262 |
| 3,693,347 | 9/1972 | Kydd et al. | 60/39.05 |
| 3,705,491 | 12/1972 | Foster-Pegg | 60/262 |
| 4,297,841 | 11/1981 | Cheng | 60/39.3 |

*Primary Examiner*—Louis J. Casaregola
*Attorney, Agent, or Firm*—Lee H. Sachs; Derek P. Lawrence

[57] ABSTRACT

A gas turbine engine comprising a compression means, combustion means, a first turbine, and a second turbine is provided with improved thermal efficiency and power output through bypassing a portion of the engine operating fluid from a first engine position downstream of at least a portion of the compression means and upstream of a control area of the first turbine and injecting at least a portion of the bypassed flow downstream of the control area of the first turbine. High pressure steam is injected at a position between the engine position initiating the bypass and the engine position injecting the bypass into the fluid stream. The amount of steam injected is substantially equivalent in mass flow to the removed fluid.

13 Claims, 2 Drawing Figures

GAS TURBINE ENGINE OF IMPROVED THERMAL EFFICIENCY

This invention relates to gas turbine engines and, more particularly, to gas turbine engines adapted to receive steam injection.

BACKGROUND OF THE INVENTION

Land-based or marine gas turbine engines frequently are derivatives of engines designed for best thermal efficiency operation in aircraft. The design predetermines such engine characteristics as pressure and volume ranges which define mass flow rates. The design also matches compressor and turbine operation to avoid the compressor approaching its stall condition. In the art, this is sometimes referred to as providing a "stall margin" and the operation of the compressor is designed to function along compressor operating lines.

Because such derivative gas turbine engines are marine or land-based, there exists a capability to enhance thermal efficiency and power output capability through the injection into the engine flow stream of an additional higher energy fluid, herein sometimes called steam, which has a specific heat at constant pressure ($C_p$) greater than the $C_p$ of the normal operating fluid flowing through the engine. One arrangement for utilizing such a higher energy fluid injected into a gas turbine engine is described in co-pending application Ser. No. 604,670—Johnson, filed Apr. 27, 1984, and assigned to the assignee of the present invention. The disclosure of that application is hereby incorporated herein by reference. As described in that application, such higher energy fluid as steam can be obtained by utilizing the heat generated by the gas turbine engine to change water to steam. Alternatively, steam can be obtained from an external source, for example as excess process steam.

SUMMARY OF THE INVENTION

It is a principal object of the present invention to provide a gas turbine engine, and a method of making and operating such an engine, of improved thermal efficiency and power output capability through the use of high energy steam.

Another object of the present invention is to provide such improved thermal efficiency and power output by substituting a higher energy fluid for a lower energy fluid constituting the operating fluid of a gas turbine engine.

Still another object is to provide a modification to gas turbine engines of existing design in order to enhance thermal efficiency and power output of such engine having predesigned operating characteristics.

These and other objects and advantages will be more fully understood from the following detailed description, the drawing, and the embodiments, all of which are intended to be typical of rather than in any way limiting on the scope of the present invention.

Briefly, the present invention in one form provides a gas turbine engine including, in operating fluid stream sequence, compression means, combustion means, a first turbine and a second turbine wherein there is provided a flow bypass means connected to the engine at a first engine position downstream of at least a portion of the compression means and upstream of a control area of the first turbine, for example, a turbine nozzle. The flow bypass means is adapted to remove from the engine fluid stream a portion of operating fluid at a first pressure. Also included is a first injection means which receives fluid from the flow bypass means and is connected to the engine at a second engine position downstream of the control area of the first turbine. The first injection means is adapted to return to the engine fluid stream at least a portion of the operating fluid removed by the bypass means. The second engine position is selected such that the operating fluid is at a second pressure lower than the first pressure in order to enable positive flow. Associated with the bypass means and the first injection means is a first valve means to adjust the amount of fluid removed from the first position and injected at the second position. At a third engine position, between the first and second positions, is a second injection means to inject into the engine operating fluid high energy steam at a pressure greater than the operating fluid pressure at the third position to enable positive flow. The amount of steam injected at the third position is substantially equivalent in mass flow to the mass flow of the fluid removed at the first position. In this way, the mass flow through the engine is maintained substantially constant. Associated with the second injection means is a second valve means to adjust the amount of steam injected through the second injection means. The first and second valve means are operated by a control means which is responsive to engine operating characteristics in order to control and modulate the flow of the fluid and steam through the first and second valve means in order to maintain the predetermined engine design fluid flow pressure and volume characteristics.

Another form of the present invention is a method for operating the above-described general type of gas turbine engine to improve its thermal efficiency and power output comprising the steps of removing a portion of fluid from the first position and reinjecting at least a portion of that fluid downstream at the second area. The high energy steam is injected at the third area in an amount substantially equivalent in mass flow to the removed fluid. The bypass of the engine operating fluid as described above and the injection of steam is controlled and modulated to maintain the predetermined design characteristics of the engine.

In still another form, a method is provided for modifying an existing design gas turbine engine of the general type described above in order to improve its thermal efficiency. Such a method includes connecting the flow bypass means to the engine at the first position, connecting the first injection means to the engine at the second position, with the first valve being connected in the bypass flow stream to adjust the amount of operating fluid flowing from and back into the engine. Also connected to the engine at the third position is the second injection means including the second valve means to adjust the amount of steam injected. A control means responsive to engine operating characteristics is connected to the first and second valve means to control the flow of fluid and steam as described above to increase engine thermal efficiency and power output over the predetermined thermal efficiency resulting from its existing design.

DESCRIPTION OF THE PREFERRED EMBODIMENTS

Many types of gas turbine engines used in land-based or marine applications are derived from engines designed for use in various types of aircraft. For example, such engines are used for the powering of marine craft, electrical generators, and various types of pumps. Such gas turbine engines originally were designed and constructed to be lightweight and to operate most efficiently in an aircraft in a predetermined compressor flow pressure ratio range and predetermined turbine flow pressure ratio range, selected for balanced operation, for example, to avoid stall in the compressor.

Steam injection has been reported to be capable of improving the operation of gas turbine engines, for example, as described in the above-incorporated application Ser. No. 604,670—Johnson. However, in order to avoid the very costly redesign and retooling for construction for such a gas turbine engine to accommodate steam injection, it is a goal for non-aircraft applications to utilize steam injection while preserving the predetermined or predesigned engine operation characteristics. For example, it is desirable to maintain the balance between the operation of the compression means and its associated turbine means and to preserve the mass flow characteristics through the engine.

The present invention, in its preferred form, provides a modification to a gas turbine engine of existing design and having predetermined design fluid flow pressure and volume characteristics. This is accomplished by replacing a portion of lower energy engine operating fluid, for example that compressed by or discharged from a compressor, with a higher energy fluid, such as high energy steam, while maintaining substantially the same mass flow through the engine. Such lower energy operating fluid then is reintroduced or injected downstream of a control area, such as a nozzle of a first turbine, typically a high pressure turbine. Modulation of the bypass flow and of the steam injection is provided by a control means which is responsive to appropriate engine operating characteristics to maintain the engine's predetermined engine design fluid flow pressure and volume characteristics.

Figure 1:
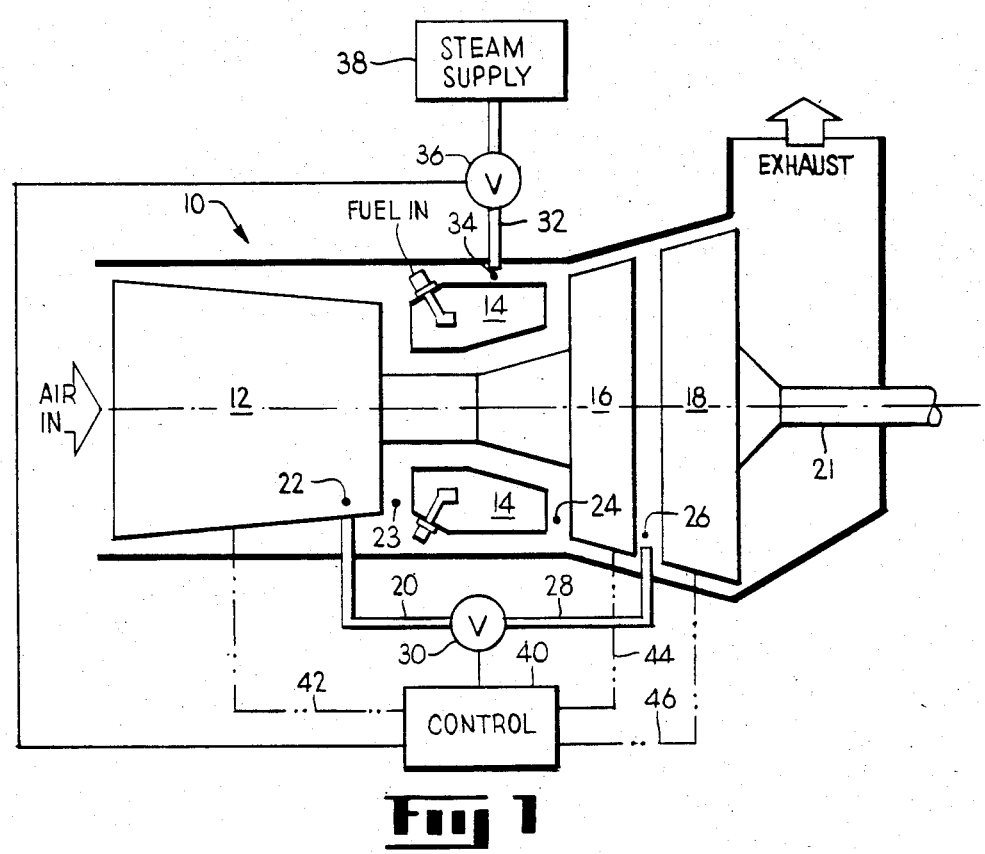
FIG. 1 is a diagrammatic view of one relatively simple form of the engine of the present invention.

The present invention will be understood more fully by reference to the drawing which is intended to be diagrammatic and typical of rather than limiting on the scope of the present invention as defined by the appended claims. With reference to FIG. 1, a gas turbine engine 10 includes, in operating fluid stream sequence, compression means 12 such as a single rotor compressor, combustion means such as combustor 14, a first turbine 16, and a second turbine 18. Typically, air introduced into the inlet of the engine is compressed by the compression means and used to support combustion in the combustion means in cooperation with fuel generally introduced at that point. Products of combustion then are expanded through the first turbine 16 which is balanced in operation to drive compressor 12. Thereafter, the operating fluid passes from first turbine 16 to be expanded through second turbine 18, which, in this example, can be a power turbine used to drive such devices as pumps, generators, etc., for example, through a power transmitting means such as shaft 21.

According to the present invention, such a typical gas turbine engine is modified, or includes in addition, a flow bypass means 20 connected to the engine at a first engine position 22 upstream of a turbine control area, for example, a turbine nozzle 24 of first turbine 16. As shown in FIG. 1, the first position is shown to be near the downstream end of compressor 12. At least a portion of the operating fluid removed by bypass 20 is injected or returned to the engine fluid stream by first injection means 28 at a second engine position 26 downstream of the first engine position and downstream of the turbine control area 24 of the first turbine. Operating fluid not returned at position 26 can be vented or can be introduced into an additional, separate turbine. Associated with bypass means 20 and first injection means 28 is first valve means 30 to adjust the amount of fluid removed from the first position 22 and injected at the second position 26. First engine position 22 and second engine position 26 are selected such that the engine operating fluid at the second engine position 26 is at a pressure lower than that at first engine position 22 in order to provide positive flow of the bypass fluid.

A second injection means 32 is connected to the engine at a third engine position 34, between first engine position 22 and turbine control area 24, to inject into the engine operating fluid high energy steam at a pressure greater than the operating fluid pressure at the third engine position 34. Associated with the second injection means 32 is a second valve means 36 to adjust the amount of steam injected into the engine at the second injection means. Providing steam to the second injection means 32 through valve 36 is a steam supply 38 which can be a source external to the engine, such as excess process steam or steam generated by heating water with heat created in the engine, for example in the engine exhaust.

First valve 30 and second valve 36 are operated by a control means 40 responsive to engine characteristics or parameters, for example, in compressor 12, first turbine 16, second turbine 18, etc. Representative of such sensing by control 40 are broken lines 42, 44, and 46. Control 40 operates valve 36 to inject into the engine at third position 34 steam in an amount substantially equivalent in mass flow to the fluid removed from the engine at first position 22 through bypass means 20.

Figure 2:
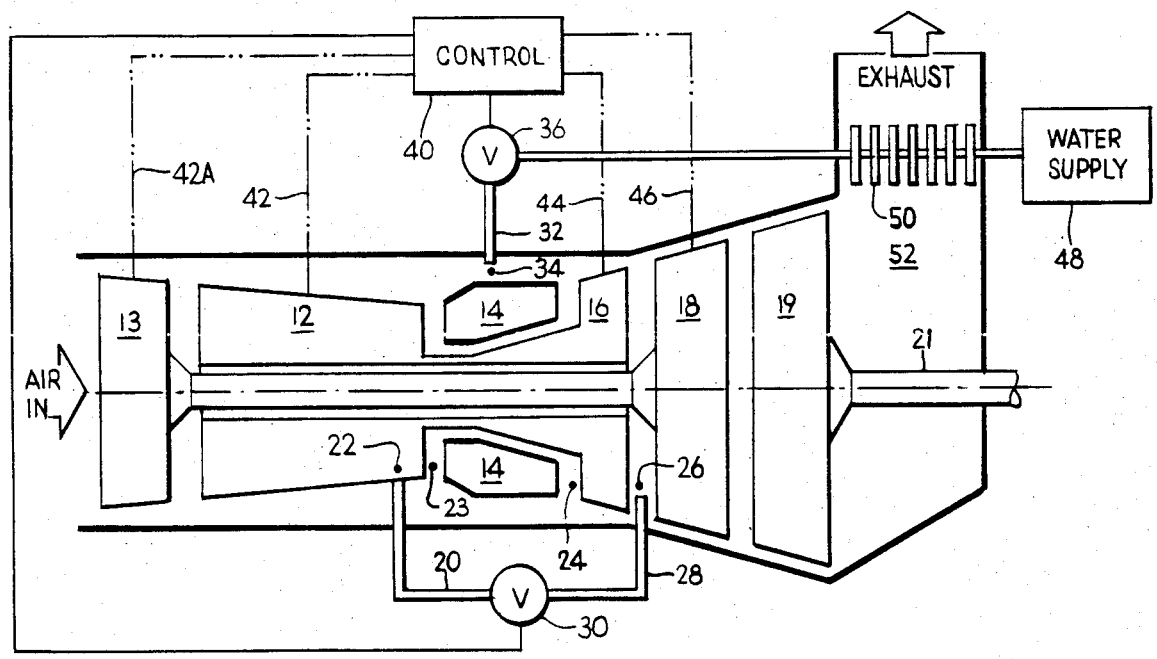
FIG. 2 is a diagrammatic view of a more complex form of the engine of the present invention.

The diagrammatic view of FIG. 2, wherein like numbers identify like components as described above in connection with FIG. 1, represents a more complex engine system. In FIG. 2, first turbine 16 is a high pressure turbine which drives high pressure compressor 12, and second turbine 18 is a lower pressure turbine which drives a lower pressure compressor, sometimes referred to as a booster, 13. Downstream of second turbine 18 is a power turbine 19, which drives external apparatus, for example pumps, generators, or marine propellers, through a power transmitting means, represented by shaft 21, of a type well-known and used in the art.

In the arrangement of FIG. 2, at least part of the steam is created from a water supply 48 passing water through heat exchanger 50 in engine exhaust 52 as described in more detail in the above-incorporated application Ser. No. 604,670. As described in that application, steam can be provided from an outside source, from an exhaust heat exchanger, from an intercooler between stages of the compression means, or their combination, depending upon the amount of steam desired to be injected into the engine at third engine position 34.

As was mentioned before, according to a preferred form of the present invention, control 40 operates valves 30 and 36 to remove and reinject engine operating fluid and to inject high energy steam, respectively. This control maintains the operating lines of the compression means, represented by compressor 12 in FIG. 1, and by booster 13 and high pressure compressor 12 in FIG. 2. It should be understood that the compression means could also include additional fan means upstream of compressor 12 in FIG. 1 and of low pressure compressor or booster 13 in FIG. 2. The goal is to hold rotor speed the same as that to which the engine was originally designed. This maintains stall margins in the compression means and preserves the most efficient compression means operating lines for best thermal efficiency or, for most power, at the maximum allowable compression means operating line. Control 40 senses such operating conditions and parameters in the engine and operates valves 30 and 36 to maintain those predetermined conditions. The amount of engine operating fluid bypassed through bypass means 20 and reinjected through injection means 28 depends upon the available amount of steam to replace it on a substantially equivalent mass flow basis. Thus, although it is desirable to bypass as much engine fluid as practical and replace it with high energy steam, the amount of bypass flow must not be greater than that which would deplete oxygen from the combustion means below that needed to support proper combustion. In addition, if the amount of bypass flow is greater than the amount of steam available for replacement, then engine performance would degrade. The practical amount of bypass flow and replacement by steam is balanced to avoid resultant temperature and pressure distortion from incomplete mixing and combustor flammability limitations.

In respect to the relation between the first, second, and third engine positions, according to the present invention, bypass flow from first engine position 22 can be made at any position upstream of a turbine control area, such as turbine nozzle 24 of first turbine 16, and reinjected at any point downstream of that control area. Steam injection in an amount to substantially replace the bypassed engine fluid in mass flow can then occur at third engine position 34 which is downstream of such first engine position 22, up to and including second position 26. Preferably, first engine position 22 is in the latter stages of the compression means, or at its discharge 23, as shown in FIGS. 1 and 2. However, according to the present invention, third engine position 34 is downstream of the compression means because the high energy or superheated steam is supplied at a pressure greater than that at the compressor discharge, for example, having been created efficiently from a water pump and a boiler system. Using the engine compressor to pressurize the steam would result in a system loss.

As was stated before, the present invention in its preferred form contemplates the removal of the lowest energy engine fluid, such as air, in or downstream of the compression means, such as high pressure compressor 12 in FIG. 2, and its replacement with high energy steam on a mass flow substantially equivalent basis. As used herein, the term "high energy steam" is intended to mean saturated steam such that the product of the mass and enthalpy of the steam is greater than the product of mass and enthalpy of the engine fluid such as compressed air which it is replacing. Reintroduction or injection of the bypassed engine operating fluid at the second engine position 26 is made to recover energy from the bypassed lower energy fluid. Replacement of the bypassed engine fluid on a substantially equivalent mass flow basis means that the mass flow of the injected steam would be substantially no greater than the mass flow of the engine fluid. However, it could be somewhat lower as long as the product of mass flow and enthalpy of the steam is greater than the product of mass flow and enthalpy of the engine fluid removed.

A specific example of performance improvement achieved through the present invention, when low energy air is replaced with high energy steam, is shown in a comparison of the following Tables I and II. The data of those tables, calculated for the same engine, are based on the engine configuration shown in FIG. 2. Table I data are based on no bypass airflow and no steam injection; Table II data are based on a 2.8 wt % air bypass and 2.8 wt % steam replacement, thereby replacing low energy air with high energy steam as shown.

TABLE I

| No Bypass Flow; No Steam Injection | | | | | |
|---|---|---|---|---|---|
| FIG. 2 Position | 12 | 13 | 21 | 23 | 24 |
| Shaft Horsepower | | | 44700 | | |
| Thermal Efficiency | | | 0.378 | | |
| Total Temperature (°F.) | | | | 971 | 2112 |
| Total Pressure (psia) | | | | 394.4 | 374 |
| Booster Airflow (lb/sec) | 274.1 | | | | |
| Compressor Airflow (lb/sec) | | 272.9 | | | |

TABLE II

| | 2.8 wt % Air Bypass and 2.8 wt % Steam Replacement | | | | | | | | |
|---|---|---|---|---|---|---|---|---|---|
| FIG. 2 Position | 12 | 13 | 21 | 23 | 24 | 20 | 22 | 26 | 32 | 34 |
| Shaft Horsepower | | | 46345 | | | | | | | |
| Thermal Efficiency | | | 0.396 | | | | | | | |
| Total Temperature (°F.) | | | | 970 | 2054 | | | | | |
| Total Pressure (psia) | | | | 394.4 | 374 | | | | | |
| Booster Airflow (lb/sec) | 274.5 | | | | | | | | | |
| Compressor Airflow (lb/sec) | | 273.3 | | | | | | | | |
| Bypass Air | | | | | | | | | | |
| Airflow (lb/sec) | | | | | | 7.64 | 7.64 | 7.64 | | |
| Temperature (°F.) | | | | | | 633 | 633 | 633 | | |
| Pressure (psia) | | | | | | 131.3 | 131.3 | 131.3 | | |
| Air Enthalpy (BTU/lb) | | | | | | 264.2 | 264.2 | 264.2 | | |
| Replacement Steam | | | | | | | | | | |
| Flow (lb/sec) | | | | | | | | | 7.65 | 7.65 |
| Temperature (°F.) | | | | | | | | | 685 | 685 |
| Pressure (psia) | | | | | | | | | 394 | 394 |
| Steam Enthalpy (BTU/lb) | | | | | | | | | 491.5 | 491.5 |

In Table II, all enthalpies are referenced to a vapor at 0° Rankine. From a comparison of these data, it is seen that practice of the present invention in the embodiment of the example significantly increases the shaft horsepower from 44,700 to 46,345 and the thermal efficiency from 37.8% to 39.6% by replacing a portion of airflow with a mass equivalent of high energy steam. However, the original design total pressure and volume characteristics of the engine are maintained. In addition, using high energy steam to replace low energy air, according to the present invention, bypassing the first stage nozzle throat control area of high pressure turbine 16 in FIG. 2, allows a reduction in turbine rotor inlet gas temperature of 58° F. (2112° F.–2054° F.) as shown in Table II for Total Temperature. Bypass of more or less air from within the compressor or at its exit would provide more or less, respectively, turbine rotor inlet temperature reduction. Bypass of air further downstream of the compressor exit would provide decreasing increments of turbine rotor inlet temperature reduction.

Another form of the present invention is a method for modifying a gas turbine engine of existing design and comprising the above-described compression means, combustion means, a first turbine, and a second turbine. The engine prior to modification has predetermined thermal efficiency and fluid flow pressure and volume characteristics. The method involves connecting to the engine at the first engine position a flow bypass means adapted to remove, as a bypass flow stream, a portion of engine operating fluid. Connected to the flow bypass means and to the engine at the second engine position is the first injection means adapted to return to the engine fluid stream at least a portion of the operating fluid removed by the bypass means. The modification further includes connecting a first valve means in the bypass flow stream to adjust the amount of operating fluid removed from the first position and injected into the second position. The method also includes connecting to the engine at the third engine position a second injection means adapted to inject into the engine operating fluid high energy steam as described above. The second injection means includes second valve means to adjust the amount of steam injected. A control means is connected to the first and second valve means to control the flow of fluid and steam, respectively, through the first and second valve means, as described above.

Another form of the present invention is a method for operating a gas turbine engine to improve thermal efficiency and power output, the engine having predetermined design fluid flow pressure and volume characteristics and including the compression means, combustion means, a first turbine, and a second turbine. The method comprises removing a portion of the operating fluid from the engine fluid stream at the first engine position and injecting at least a portion of the removed fluid into the fluid stream downstream of the control area of the first turbine. Also, high energy steam is injected into the engine fluid stream at the above-described third engine position in an amount substantially equivalent in mass flow to the removed fluid. The amount of operating fluid removed at the first engine position and injected at the second position, as well as the amount of steam injected at the third engine position is controlled to substantially maintain the predetermined design fluid flow pressure and volume characteristics.

Although the present invention has been described in various forms and in connection with specific embodiments and examples, it will be understood by those skilled in the art that the invention is capable of other examples and embodiments without departing from the scope of the appended claims.

What is claimed is:

1. A gas turbine engine including, in operating fluid stream sequence, compression means, combustion means, a first turbine, and a second turbine, the engine comprising:
   flow bypass means connected to the engine at a first engine position downstream of at least a portion of the compression means and upstream of a control area of the first turbine, and adapted to remove from the engine fluid stream a portion of operating fluid at a first pressure;
   first injection means receiving fluid from the flow bypass means and connected to the engine at a second engine position downstream of the control area of the first turbine, the first injection means adapted to return to the engine fluid stream at least a portion of the operating fluid removed by the bypass means, the operating fluid at the second position being at a second pressure lower than the first pressure;
   first valve means associated with the bypass means and with the first injection means to adjust the amount of fluid removed from the first position and injected at the second position;
   second injection means connected to the engine at a third engine position between the first and second positions downstream of the compression means, to inject into the engine operating fluid high energy steam at a pressure greater than operating fluid pressure at the third position, the steam being injected in an amount substantially equivalent in mass flow to the removed fluid;
   second valve means associated with the second injection means to adjust the amount of steam injected into the engine at the second injection means; and
   control means responsive to engine operating characteristics to operate the first and second valve means to control the flow of fluid and steam, respectively, through the first and second valve means to maintain engine design fluid flow pressure and volume characteristics.

2. The gas turbine engine of claim 1 wherein the engine is of existing design and has predetermined design fluid flow pressure and volume characteristics.

3. The gas turbine engine of claim 1 wherein:
   the first engine position is upstream of the combustion means; and
   the third engine position is downstream of the compression means and upstream of the first turbine.

4. The gas turbine engine of claim 1 including, in operating fluid flow sequence, a low pressure compressor, a high pressure compressor, combustion means, a high pressure turbine, and a low pressure turbine, wherein:
   the first engine position is downstream of at least a portion of the high pressure compressor and upstream of a control area of the high pressure turbine;
   the first injection means is connected to the engine at the second engine position downstream of the control area of the high pressure turbine; and
   the second injection means is connected to the engine at the third engine position between the first and second positions and downstream of the high pressure compressor.

5. The gas turbine engine of claim 4 in which the second injection means is connected to the engine between the first and second engine positions downstream of the high pressure compressor and upstream of the high pressure turbine.

6. A method for modifying a gas turbine engine of existing design and comprising, in operating fluid stream sequence, compression means, combustion means, a first turbine, and a second turbine, the engine, prior to modification, having predetermined thermal efficiency, power output, and fluid flow pressure and volume characteristics, comprising the steps of:

connecting to the engine at a first engine position downstream of at least a portion of the compression means and upstream of a control area of the first turbine a flow bypass means adapted to remove, as a bypass flow stream, a portion of operating fluid at a first pressure;

connecting to the flow bypass means and to the engine at a second engine position downstream of the control area of the first turbine a first injection means adapted to return to the engine fluid stream at least a portion of the operating fluid removed by the bypass means, the operating fluid at the second engine position being at a pressure lower than the first pressure;

connecting a first valve means in the bypass flow stream to adjust the amount of operating fluid removed from the first position and injected into the second position;

connecting to the engine at a third engine position between the first and second engine positions and downstream of the compression means a second injection means adapted to inject into the engine operating fluid high energy steam at a pressure greater than operating fluid pressure at the third engine position, the second injection means including second valve means to adjust the amount of steam injected; and connecting to the first and second valve means a control means responsive to engine operating characteristics to operate the first and second valve means to control the flow of fluid and steam, respectively, through the first and second valve means to inject steam in an amount substantially equivalent in mass flow to the removed engine operating fluid and to maintain preselected engine operating characteristics while increasing engine thermal efficiency and power output over the predetermined thermal efficiency and power output.

7. The method of claim 6 wherein:
the flow bypass means is connected to the engine upstream of the combustion means; and
the second injection means is connected to the engine between the first and second engine positions downstream of the compression means and upstream of the first turbine.

8. The method of claim 6 in which the engine includes, in operating fluid flow sequence, a low pressure compressor, a high pressure compressor, combustion means, a high pressure turbine, and a low pressure turbine wherein:
the flow bypass means is connected downstream of at least a portion of the high pressure compressor and upstream of the high pressure turbine; and
the second injection means is connected to the engine between the first and second engine positions and downstream of the high pressure compressor and upstream of the high pressure turbine.

9. The method of claim 8 in which the flow bypass means is connected upstream of the combustion means.

10. A method for operating a gas turbine engine to improve thermal efficiency and power output, the engine having predetermined design fluid flow pressure and volume characteristics, the engine including, in operating fluid stream sequence, compression means, combustion means, a first turbine, and a second turbine, comprising the steps of:

removing from the engine fluid stream, at a first engine position downstream of at least a portion of the compression means and upstream of a control area of the first turbine, a portion of the operating fluid at a first pressure;

injecting into the engine fluid stream, at a second engine position downstream of the control area of the first turbine, at least a portion of the operating fluid removed at the first engine position, the engine fluid stream at the second engine position being at a second pressure lower than the first pressure;

injecting into the engine fluid stream, at a third engine position between the first and second engine positions and downstream of the compression means, high energy steam at a pressure greater than operating fluid pressure at the third engine position, the steam being injected in an amount substantially equivalent in mass flow to the removed fluid; and controlling the amount of operating fluid removed from the first engine position and injected at the second engine position, and the amount of steam injected at the third engine position, to substantially maintain the predetermined design fluid flow pressure and volume characteristics.

11. The method of claim 10 in which:
the portion of the operating fluid is removed upstream of the combustion means; and
the high energy steam is injected between the first and second engine positions downstream of the compression means and upstream of the first turbine.

12. The method of claim 10 in which the engine includes, in operating fluid flow sequence, a low pressure compressor, a high pressure compressor, combustion means, a high pressure turbine, and a low pressure turbine wherein:
the portion of the operating fluid is removed downstream of at least a portion of the high pressure compressor and upstream of the high pressure turbine; and
the high energy steam is injected between the first and second engine positions downstream of the high pressure compressor and upstream of the high pressure turbine.

13. The method of claim 12 in which the high energy steam is injected upstream of the combustion means.

* * * * *